US011284613B1

(12) United States Patent
Middleton

(10) Patent No.: US 11,284,613 B1
(45) Date of Patent: Mar. 29, 2022

(54) WATER ANIMAL DETERRENT

(71) Applicant: Michael Middleton, Boca Raton, FL (US)

(72) Inventor: Michael Middleton, Boca Raton, FL (US)

(*) Notice: Subject to any disclaimer, the term of this patent is extended or adjusted under 35 U.S.C. 154(b) by 295 days.

(21) Appl. No.: 16/710,076

(22) Filed: Dec. 11, 2019

(51) Int. Cl.
*A01M 29/10* (2011.01)
*A01M 29/16* (2011.01)

(52) U.S. Cl.
CPC ............ *A01M 29/16* (2013.01); *A01M 29/10* (2013.01)

(58) Field of Classification Search
CPC .............................. A01M 29/16; A01M 29/10
See application file for complete search history.

(56) References Cited

U.S. PATENT DOCUMENTS

| 6,408,559 | B2 | 6/2002 | Mathews |
| 9,640,058 | B1 | 5/2017 | Bollman et al. |
| 2020/0154695 | A1* | 5/2020 | Carnell ................. A01M 29/16 |

FOREIGN PATENT DOCUMENTS

KR 101506608 B1 * 3/2015

* cited by examiner

*Primary Examiner* — Ian J Lobo
(74) *Attorney, Agent, or Firm* — Sanchelima & Associates, P.A.; Christian Sanchelima; Jesus Sanchelima

(57) ABSTRACT

A water animal deterrent is disclosed herein. The water animal deterrent includes an animatronic spider having moving legs, multiple lights, Bluetooth speakers, and motion detectors, where the device is powered by a rechargeable battery and solar panels. The water animal deterrent is placed near a swimming pool to protect the pool against various vermin that may come into contact and contaminate the pool. The motion detectors of the water animal deterrent detect the presence of any vermin that walks by a swimming pool. If vermin are detected, the legs of the animatronic body begin to move, and the lights begin to illuminate. As a result, the vermin in the vicinity of the swimming pool are scared away. The water animal deterrent further includes a Bluetooth speaker to facilitate a noise to scare the vermin away. The speaker may also be used for entertainment purposes.

10 Claims, 6 Drawing Sheets

WATER ANIMAL DETERRENT

BACKGROUND OF THE INVENTION

1. Field of the Invention

The present invention relates to a water animal deterrent and, more particularly, to a water animal deterrent in the shape in the shape of an animatronic spider having moving legs and multiple lights.

2. Description of the Related Art

Several designs for an animatronic spider have been designed in the past. None of them, however, include an animal deterrent comprising an animatronic spider having moving legs, multiple lights, Bluetooth speakers, and motion detectors, where the device is powered by a rechargeable battery and solar panels. It is known that an individual may often have the need to scare away vermin such as raccoons and other pests from their backyard. Specifically, a user may want to ward of vermin that may come in contact with a pool that a user has in their backyard. The vermin may contaminate the pool by defecating in it or transporting other bacteria present on the vermin. Furthermore, this contamination may be harmful for owners of the home and individuals that may find themselves swimming in contaminated water. This may cause an individual to become very sick and may lower the value of a user's home. Therefore, there is a need for a water animal deterrent that efficiently and effectively scares of vermin that may come into contact with an individual's pool. The water animal deterrent includes audio and visual responses that fend of vermin that come near the device. The device ensures the protection and quality of the pool water from the contamination of diseases. Additionally, the water animal deterrent includes a rechargeable solar powered battery that provides a user the optimal method for using the water animal deterrent.

Applicant believes that a related reference corresponds to U.S. Pat. No. 6,408,559 issued for an animated waterfowl decoy apparatus. Furthermore, Applicant believes another reference relates to U.S. Pat. No. 9,640,058 issued for a swimming pool monitor that detects the presence of a person in a pool. However, these references differ from the present invention because they collectively fail to disclose an animal deterrent comprising an animatronic spider having moving legs, multiple lights, Bluetooth speakers, and motion detectors, where the device is powered by a rechargeable battery and solar panels. The present invention addresses these issues by providing an animatronic body in the shape of the spider. The animatronic body is powered through solar energy which allows a user to save money on their energy bill. The Bluetooth speaker of the animatronic body allows a user to utilize a mobile device and use the speaker for entertainment purposes.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a water animal deterrent that provides an effective way to keep rodents and small animals away form a swimming pool.

It is another object of this invention to provide a water animal deterrent that prevents animals from leaving droppings or feces behind on the ground or a pool deck.

It is still another object of the present invention to provide a water animal deterrent that eliminates the need for pool owners to clean up after rodents and enhances the sanitation and safety of a swimming pool.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
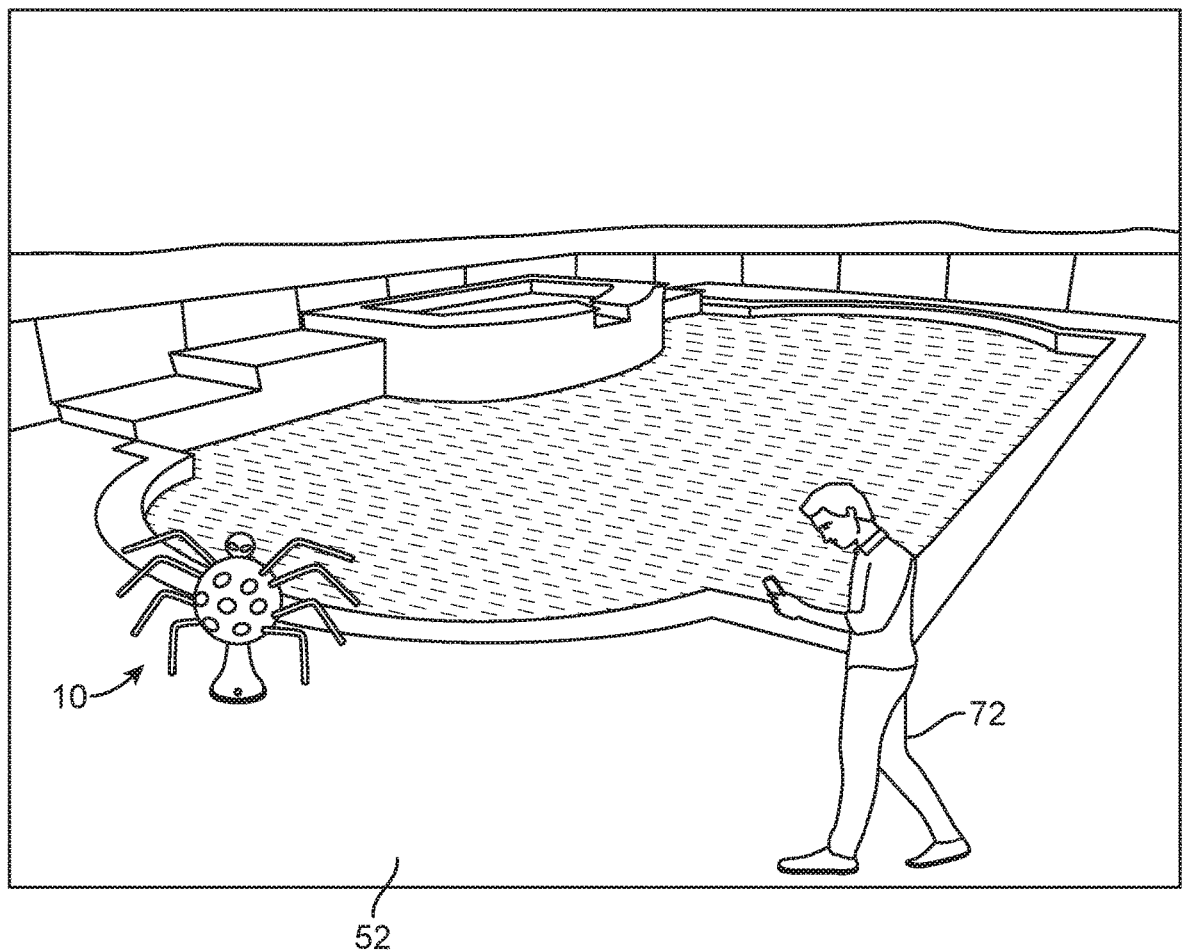
FIG. 1 represents an isometric view of water animal deterrent 10 in its operational setting in accordance to an embodiment of the present invention.

Referring now to the drawings, where the present invention is generally referred to with numeral 10, it can be observed a water animal deterrent 10 including a animatronic assembly 20, a communication assembly 40, a pool deck 52, and a mobile device 72.

Figure 2:
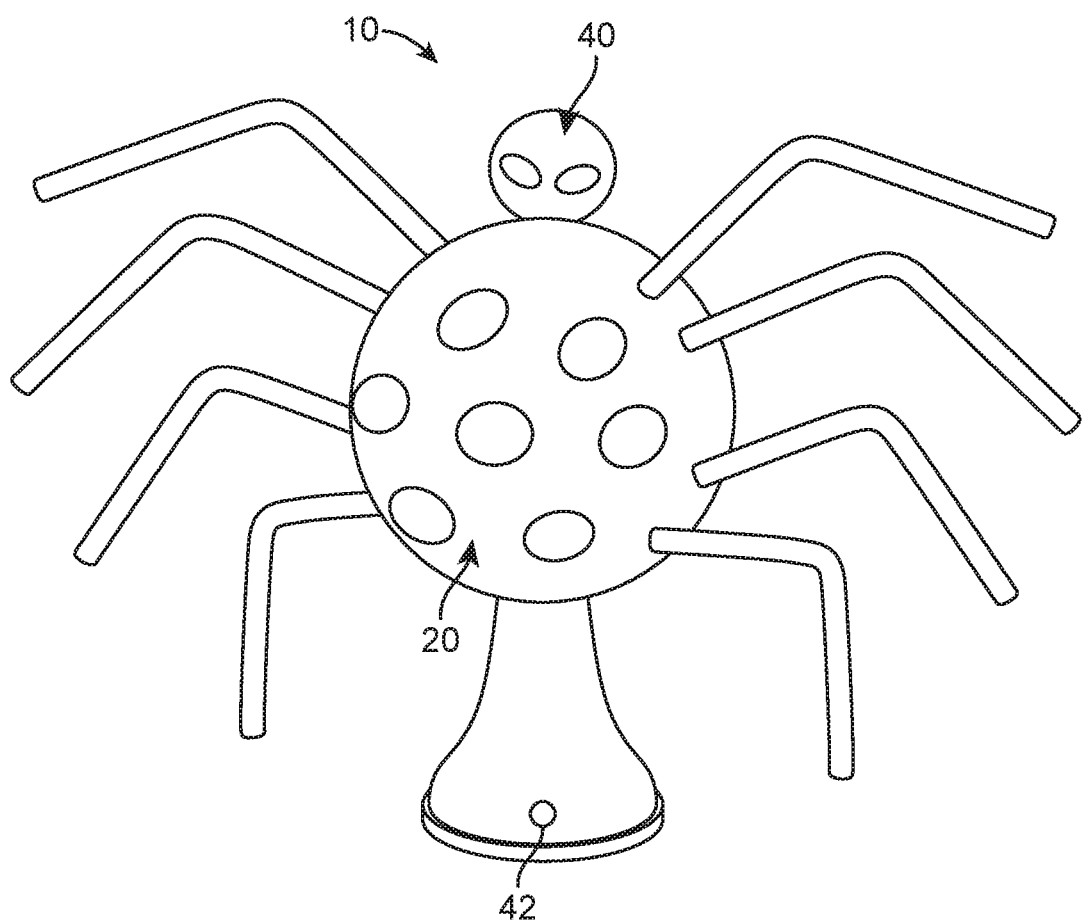
FIG. 2 shows an isometric view of water animal deterrent 10 in accordance to an embodiment of the present invention.
Figure 3:
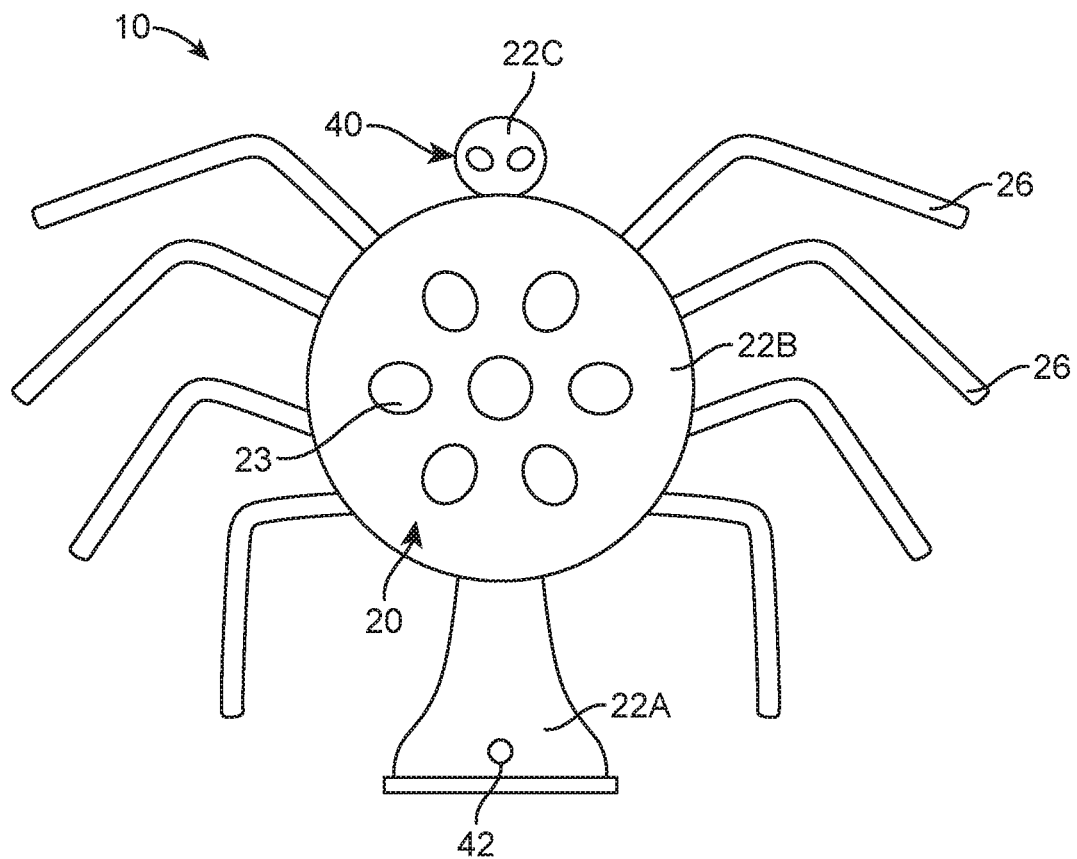
FIG. 3 illustrates a front view of water animal deterrent 10 in accordance to an embodiment of the present invention.
Figure 4:
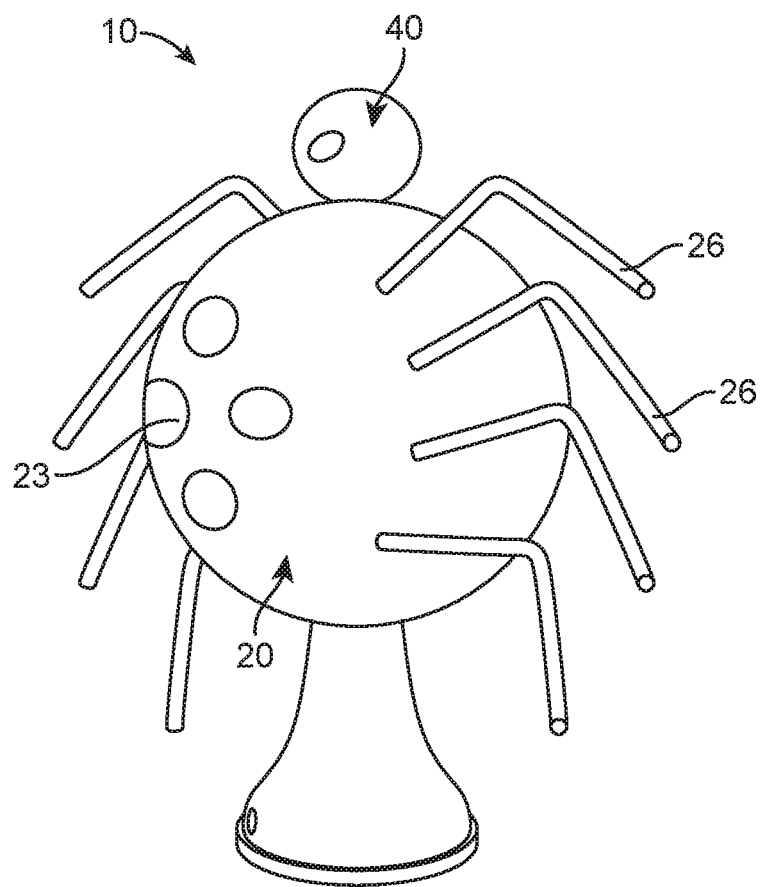
FIG. 4 is a representation of a side view of water animal deterrent 10 in accordance to an embodiment of the present invention.
Figure 5:
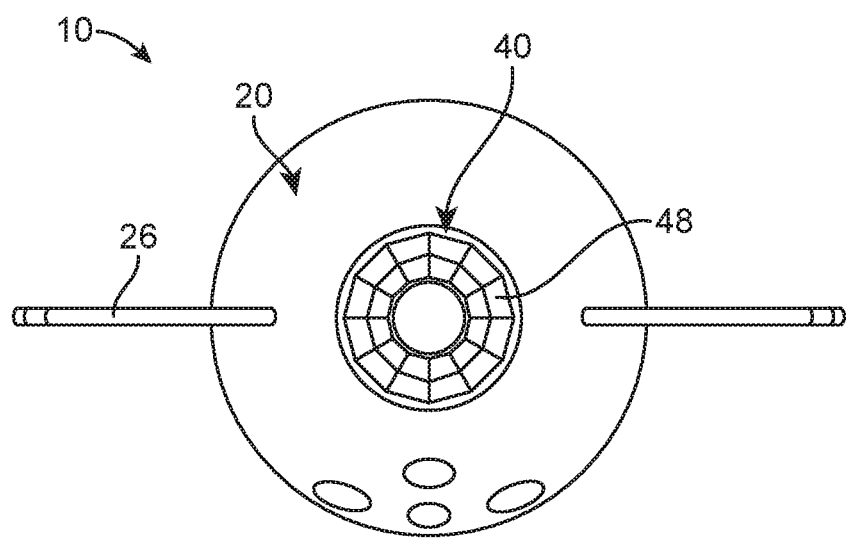
FIG. 5 shows a top view of water animal deterrent 10 in accordance to an embodiment of the present invention.
Figure 6:
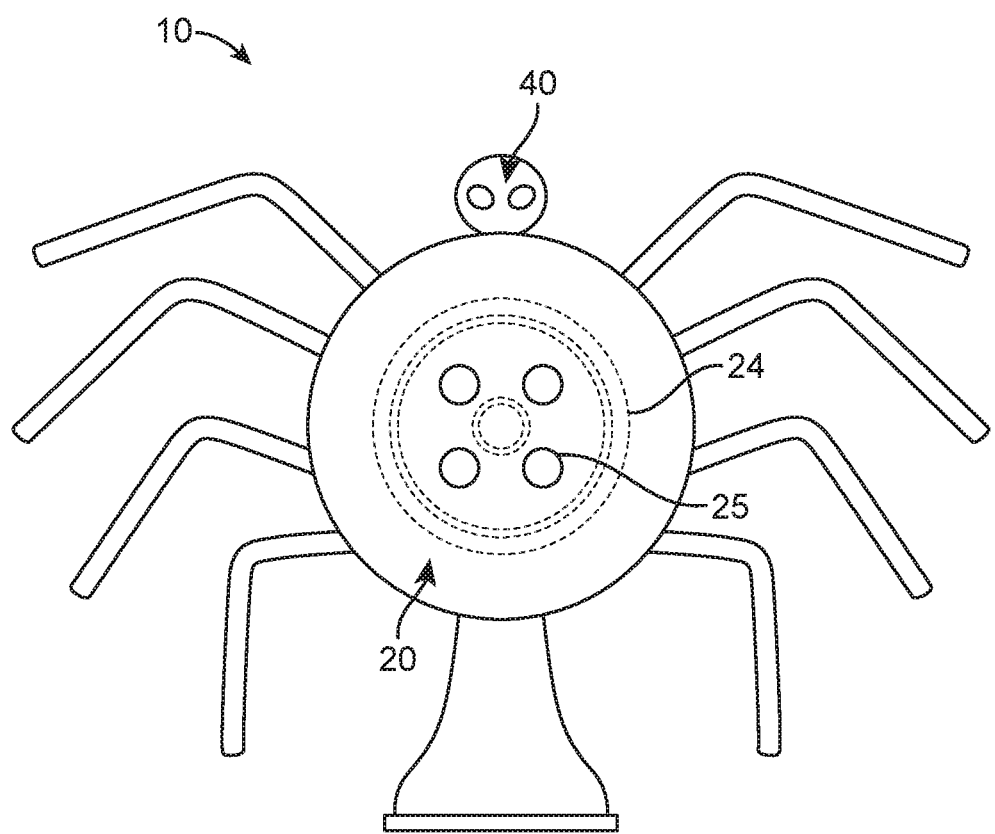
FIG. 6 illustrates a back view of water animal deterrent 10 in accordance to an embodiment of the present invention.
Figure 7:
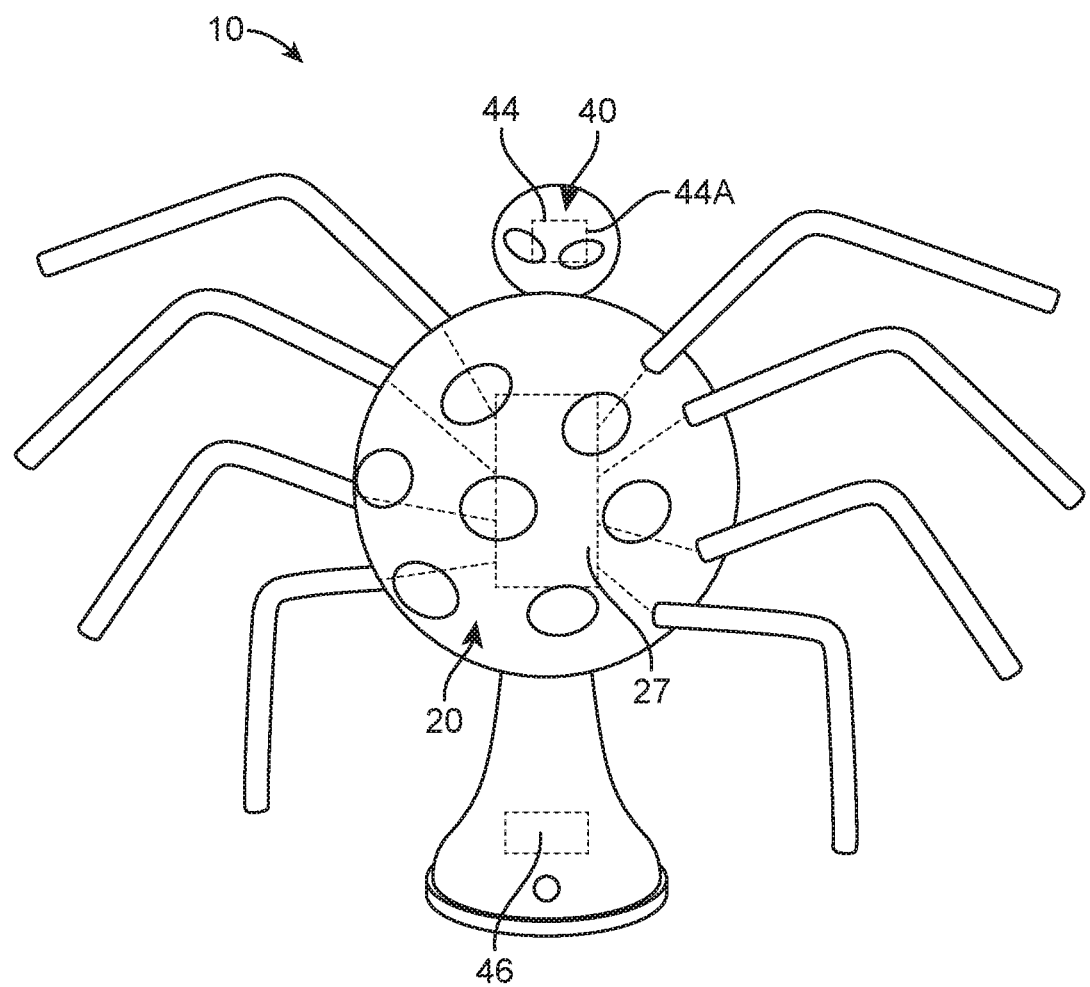
FIG. 7 represents an isometric view of water animal deterrent 10 depicting internal components in accordance to an embodiment of the present invention.

Animatronic assembly 20 includes an animatronic body 22 having a base 22A, a first spherical portion 22B, and a second spherical portion 22C. In one embodiment, animatronic body 22 is shaped is such a way to resemble an animatronic spider. However, it should be understood that additional embodiments may include an animatronic body 22 having a shape resembling other animals such as but not limited to a crocodile, frog, and the like. Furthermore, animatronic body 22 may be placed on or near pool deck 52 to be used to scare of vermin that may attempt to contaminate a pool of a user. Additionally, animatronic body 22 may be made of any suitable material to withstand long periods of time in an outdoor environment. This may include materials such as but not limited to metals, plastics, and the like. In one embodiment, base 22A has the shape of a curved truncated cone. A bottom end of base 22A may further include a cylindrical bottom end. The shape of base 22A, provides the necessary support needed to mount animatronic body 22 on pool deck 52. In one embodiment, first spherical portion 22B has a suitable predetermined radius and is mounted on a top end of base 22A. In one embodiment, first spherical portion 22B may be hollow therein to fit a variety of electrical components that are associated with the function of animatronic assembly 20. Additionally, first spherical portion 22B may be provided as an integral part of base 22A. First spherical portion 22B may also be provided as a removable portion of base 22A. First spherical portion 22B may further include LEDs 23 (Light Emitting Diodes) located on a front end. In one embodiment, LEDs 23 may be provided as a circular shape and may further cover a predetermined area of the front end of first spherical portion 22B. Additionally, LEDs 23 may be provided in a circular configuration having a central LED as seen in FIG. 2. Furthermore, LEDs 23 may provide a red light that is used to fend of vermin that come near to animatronic body 22. Other embodiments may include LEDs of different shapes and colors located on animatronic body 22.

Animatronic assembly 20 may further include a speaker 24 located on a back end of first spherical portion 22B. In one embodiment, speaker 24 may be located therein first spherical portion 22B and covers a predetermined area of the back end of first spherical portion 22B. Additionally, openings 25 may be included on a surface area of the back end of first spherical portion 22B to allow the sound waves generated by speaker 24 to be properly audible. First spherical portion 22B may further include legs 26 mounted along sides of first spherical portion 22B. In one embodiment, legs 26 are angled rods each having a predetermined angle. Furthermore, legs 26 may be made of the same material as that of animatronic body 22. Additionally, legs 26 extend outwardly a predetermined amount from first spherical portion 22B. It should be understood, that any predetermined amount of legs may be provided thereon first spherical portion 22B. Legs 26 may further be attached to a motor 27 located therein first spherical portion 22B. Motor 27 may be any suitable motor for actuating legs 26 to move in a predetermined configuration. In one embodiment, legs 26 may be configured to move in an up and down configuration. This up and down movement proves effective in scaring of vermin that may come near animatronic body 22. First spherical portion 22B may further include second spherical portion 22C mounted on a top end. In one embodiment, second spherical portion 22C includes a diameter that is significantly less than that of first spherical portion 22B. Second spherical portion 22C may further include LEDs 23 mounted on a front end. In one embodiment, LEDs 23 of second spherical portion 22C may have a shape that is different that the LEDs 23 of first spherical portion 22C. LEDs 23 of second spherical portion 22C may have an oval shape to that are angled to resemble menacing eyes of an animatronic spider. Animatronic assembly 20 provides a user with an optimal body for scaring away vermin from a pool deck.

Communication assembly 40 includes a motion detector 42. In one embodiment, motion detector 42 may be located within base 22A of animatronic body 22. Motion detector 42 is provided as a hardware component that is capable of detecting motion from vermin that may happen to approach animatronic assembly 20. Furthermore, motion detector 42 may be configured to detect motion along a predetermined space of animatronic assembly 20. In one embodiment, motion detector 42 is communicably attached to a microprocessor 44 housed within second spherical portion 22C. Microprocessor 44 is provided as a hardware component therein animatronic body 22 and may be of any suitable microprocessor for processing information. In one embodiment, microprocessor 44 receives the information detected by motion detector 42. In a situation where motion detector 42 detects a predetermined amount of motion, microprocessor 44 will then actuate motor 27. In turn, legs 26 then preform a predetermined moving motion to fend of potential vermin that come within the vicinity of motion detector 42. Additionally, microprocessor 44 may further actuate speaker 24 to release a high-pitched noise audible to vermin within the vicinity of motion detector 42. As a result, the vermin are effectively scared away and no longer capable of contaminating a user's pool. In one embodiment, microprocessor 44 further includes a wireless communication module 44A. Wireless communication module 44A is provided as hardware on microprocessor 44 and allows a user to connect a mobile device 72 to the water animal deterrent 10. A user may then be able to broadcast audio media from speaker 24 for events such as parties and gatherings that may occur near a user's pool. This may include using wireless communication methods such as WIFI, Bluetooth, and the like. Communication assembly 40 may further include a rechargeable battery 46 located within base 22A. Battery 46 may be any suitable rechargeable battery suitable to power LEDs 23, speaker 24, motor 27, motion detector 42, and microprocessor 44. Furthermore rechargeable battery 46 may be communicably mounted to solar panels 48 located on a top end of second spherical portion 22C. Solar panels 48 may be of any suitable solar panels for recharging the rechargeable battery 46.

In one embodiment, a user places water animal deterrent 10 next on a pool deck 52. In the event that vermin may come within the vicinity of pool deck 52, water animal deterrent 10 will then move its legs 26 and broadcast a high-pitched noise from speaker 24. As a result, the vermin are effectively scarred away, and contamination is prevented for a user's pool. Water animal deterrent 10 provides a user with an effective method for keeping a sanitary pool against vermin. This may include vermin that may contaminate a pool such as but not limited to raccoons, frogs, and pigeons.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:
1. A system for a water animal deterrent, comprising:
   a. an animatronic assembly, including an animatronic body having a base, a first spherical portion, and a second spherical portion, wherein said base has the shape of a curved truncated cone, wherein said first spherical portion is mounted on a top end of said base, wherein said first spherical portion has a predetermined volume, wherein said first spherical portion includes LEDs mounted on a front end of said first spherical portion, wherein said first spherical portion further includes a speaker mounted within a back end of said first spherical portion, wherein said back end further includes openings configured to allow sound from said speaker to pass through, wherein said first spherical portion further includes legs mounted along sides of said first spherical portion, wherein said legs are attached to a motor located within said first spherical portion, wherein said motor actuates said legs to shake and move, wherein said second spherical portion is mounted on top of said first spherical portion, wherein said second spherical portion includes a diameter that is less than the diameter of said first spherical portion, wherein said second spherical portion further includes said LEDs mounted thereon, wherein said animatronic assembly is an animatronic spider; and b. a communication assembly, including a motion detector mounted on said base, wherein said motion detector is configured to detect the motion of any vermin that passes by said motion detector, wherein said communication assembly further includes a microprocessor housed within said second spherical portion, wherein said microprocessor receives information from said motion detector, wherein said microprocessor actuates said motor to then actuate said legs upon the detection of motion configured to scare of vermin, said microprocessor further actuating said speaker to broadcast a high pitched noise configured to scare off vermin, wherein said communication assembly further includes a rechargeable battery housed within said base, wherein said rechargeable battery is communicably mounted to solar panels, wherein said solar panels are located on a top end of said second spherical portion and provide charge for said rechargeable battery.

2. The system for a water animal deterrent of claim 1 wherein said legs are angled rods each having a predetermined angle.

3. The system for a water animal deterrent of claim 1 wherein said LEDs of said second spherical portion have a shape that is different than said LEDs of said first spherical portion.

4. The system for a water animal deterrent of claim 1 wherein said microprocessor further includes a wireless communication module.

5. The system for a water animal deterrent of claim 4 wherein a user connects a mobile device to said wireless communication module to then broadcast audio media from said speaker.

6. The system for a water animal deterrent of claim 1 wherein said rechargeable battery powers said LEDs, said motor, said speaker, said microprocessor and said motion detector.

7. The system for a water animal deterrent of claim 1 wherein said LEDs are circular in shape and cover a predetermined area of said front end.

8. The system for a water animal deterrent of claim 1 wherein said base further includes a cylindrical bottom end.

9. The system for a water animal deterrent of claim 1 wherein said animatronic body is placed on a pool deck.

10. A system for a water animal deterrent, comprising:
a. a pool deck;
b. a mobile device;
c. an animatronic assembly, including an animatronic body having a base, a first spherical portion, and a second spherical portion, wherein said base has the shape of a curved truncated cone, wherein said base further includes a cylindrical bottom end, wherein said first spherical portion is mounted on a top end of said base, wherein said first spherical portion has a predetermined volume, wherein said first spherical portion includes seven LEDs mounted on a front end of said first spherical portion, wherein said seven LEDs are circular in shape and cover a predetermined area of said front end, wherein said first spherical portion further includes a speaker mounted within a back end of said first spherical portion, wherein said back end further includes openings configured to allow sound from said speaker to pass through, wherein said first spherical portion further includes legs mounted along sides of said first spherical portion, wherein said legs are angled rods each having a predetermined angle, wherein said legs are attached to a motor located within said first spherical portion, wherein said motor actuates said legs to shake and move, wherein said second spherical portion is mounted on top of said first spherical portion, wherein said second spherical portion includes a diameter that is less than the diameter of said first spherical portion, wherein said second spherical portion further includes two LEDs mounted thereon, said two LEDs having an oval shape configured to resemble eyes, wherein said animatronic assembly is an animatronic spider; and d. a communication assembly, including a motion detector mounted on said base, wherein said motion detector is configured to detect the motion of any vermin that passes by said motion detector, wherein said communication assembly further includes a microprocessor housed within said second spherical portion, wherein said microprocessor receives information from said motion detector, wherein said microprocessor actuates said motor to then actuate said legs upon the detection of motion configured to scare of vermin, said microprocessor further actuating said speaker to broadcast a high pitched noise configured to scare off vermin, wherein said communication assembly further includes a rechargeable battery housed within said base, wherein said rechargeable battery is communicably mounted to solar panels, wherein said solar panels are located on a top end of said second spherical portion, wherein said microprocessor further includes a wireless communication module, wherein a user connects a mobile device to said wireless communication module to then broadcast audio media from said speaker.

* * * * *